Patented Jan. 26, 1932

1,842,757

UNITED STATES PATENT OFFICE

HERBERT T. LEO, OF CORONA, CALIFORNIA

JELLY COMPOUND

No Drawing. Application filed February 4, 1927. Serial No. 166,020.

My invention relates more particularly to a powdered preparation which may be shipped and sold in dry form and used for the making of jelly by the addition thereto of the required amount of water and sugar. Prior to the present invention, pectin, one of the essential ingredients of jelly, had long been on the market in the form of a solution which was used by the housewife in making jelly by adding it to the other necessary ingredients including water, sugar, flavoring matter and acid, the flavoring matter and acid being commonly derived directly from fruit. Later there has been on the market a dry preparation consisting of powdered pectin, sugar and a small amount of acid, all in dry, powdered form, which is used in the making of jellies and jams by adding it with flavoring matter and an additional amount of sugar to the required amount of water, the process commonly employed being to first stir the powdered compound into the water, bring it to a boil and then add the remaining amount of sugar required. There is a slight tendency, with time, however, for such dry mixture to become lumpy, due, apparently, to the action of the acid contained therein, on the other ingredients. While this difficulty can be met by leaving the acid out of the composition, if this is done it puts the burden upon the housewife, where the flavoring matter used is devoid of or insufficiently supplied with acid to cooperate with the pectin in jellifying the sugar, of adding the required amount of acid with the chance of making a mistake as to the proper amount. The addition of sugar or an equivalent to the mixture is necessary in order to disperse the pectin as otherwise when added to the water it is very slow to dissolve.

The present invention has for its object to provide a mixture containing suitable amounts of acids, pectin, and sugar, and if desired, flavoring matter, of satisfactory keeping qualities, which will not lump or aggregate together in the package, notwithstanding exposure to the atmosphere, and which will very quickly dissolve in hot water, so that jelly may be readily made therefrom and in a very short time by adding it to water, bringing the water to a boil and adding the required complement of sugar.

I have discovered that if the sugar, which is to form a component of the mixture, be first heated and melted to drive off the major portion of the water of crystallization contained therein, and the acid be added to the molten sugar thereafter, as a solution containing approximately the amount of water necessary to replace the water of crystallization driven off from the sugar, when the mass cools it will form a hard, dry mass that can be easily pulverized and when the powder so formed is mixed with pectin the resultant mixture will not absorb moisture to an appreciable extent even when exposed to a fairly moist atmosphere. The mixture will keep, practically indefinitely, without lumping or agglomerating and therefore it may be satisfactorily shipped and sold in cartons or other packages which are not airproof.

My invention therefore consists in a mixture such as above described and the process of making the same.

Where in this specification I refer to sugar, it is to be understood that I intend to designate sugars which normally contain water of crystallization and particularly dextrose. I have found dextrose, as found upon the market particularly in the form known as cerelose, particularly well adapted for carrying out my invention, and in illustrating the invention will refer to a mixture in which dextrose is used.

In the preferred practice of my invention cerelose, (hydrous dextrose) in the amount which it is proposed to use in the mixture is first heated in a kettle while stirring until it melts and the temperature is gradually raised to about 155° centigrade. At this temperature the water of crystallization is substantially driven off. The material is then cooled to about 100° C. and the acid added at about this temperature. The acid is added in solution in water, the amount of water being substantially that necessary to replace the water of crystallization driven off in the heating of the dextrose as above described. As an example of my process which has proven satisfactory, 40 ounces of dextrose (in the hydrous state) was heated as above described and after the water of crystallization was driven off and the temperature dropped to about 100° centigrade, two ounces of dry acid (citric or tartaric) was dissolved in sufficient water to make a total solution of six fluid ounces. The solution was stirred into the dextrose, the latter being at about the temperature of 100° C., and the mixture was allowed to cool to the room temperature. A small amount of crystalline dextrose was incorporated, (to assist in the crystallization of the mass) and the latter was then set aside to harden. It formed a dry cake in less than 24 hours which could be readily pulverized.

Obviously, the acid solution may be obtained in other ways than by dissolving crystals thereof in water. The acid solution might be formed directly from fruit juices by proper concentrating methods in which case it would contain the flavoring matter from the fruit. If desired, flavoring matter otherwise obtained may be added to the acid solution, and coloring matter may also be added to the solution to give a pleasing color to the jelly to be formed. If fruit juices, acid juices, concentrates or extracts are used, acid may be added in proper proportion thereto and the solution then added to the molten dextrose as above described. It is not necessary, though preferable, to cool the melt before adding the solution of acid thereto, but if volatile flavors or acids are to be added a considerable portion thereof may be distilled off unless the melt is cooled before such solutions are poured into it.

As an example of the practice of my process in which flavoring matters and coloring are added, I have used 40 ounces of dextrose and after driving off the water of crystallization and lowering the temperature, have added thereto two ounces of tartaric or citric acids dissolved in 6½ ounces of liquid flavor containing the desired coloring matter.

It would appear that in the practice of my process as above described, the dehydrated dextrose in crystallizing takes up the water in which the acid and other matter is added. The mixture when produced in the above described manner and powdered may be mixed with pectin and the mixture resulting is found to have unusual keeping properties, being practically proof against lumping or conglomeration under the ordinary atmospheric conditions.

Powdered pectin may be mixed with the dextrose-acid composition in varying proportions. I have found, for example, that a satisfactory jelly-making material for the market can be made by mixing about two parts of 160 grade pectin with forty to fifty parts of the dextrose acid composition. After the materials have been intimately mixed the mixture is ready for the market and may be packaged in ordinary cardboard containers for sale and distribution.

Manifestly, the proportions given above are illustrative though I have found them very satisfactory. If desired as much as twenty percent. of the total weight of the dextrose-acid mixture may be acid, though lesser amounts of acid are normally desirable, and the proportion of pectin to the dextrose-acid composition may be varied considerably from the figures given, depending upon the jellifying strength of the pectin, it being desirable, of course, to use only so much pectin as will effect the desired results.

The dehydrated or anhydrous dextrose or other sugar may be prepared otherwise than above indicated without departing from my invention, provided that in the practice of the process it is hydrated in the manner described, to wit, by means of the solution of acid.

I claim:

1. A process for preparing a jelly-making product, comprising treating anhydrous sugar at a temperature at which it is molten with an amount of a solution containing an edible acid which the sugar can absorb as a solid, cooling and grinding the resultant product and intimately mixing the powder so formed with powdered pectin.

2. A process for preparing a jelly-making product, comprising treating an anhydrous sugar at a temperature at which it is molten with a solution containing an edible acid and water in approximately the amount necessary to hydrate the sugar and intimately mixing the resulting material with powdered pectin.

3. A process for preparing a jelly-making product, comprising heating hydrous sugar to a temperature at which the water of crystallization is substantially driven off, mixing the resultant anhydrous sugar while in molten condition with an amount of a solution containing an edible acid which the sugar can absorb as a solid and intimately mixing the resulting material with powdered pectin.

4. A process for preparing a jelly-making product, comprising heating hydrous sugar to a temperature of approximately 155° C., thereby driving off the water of crystallization, permitting the sugar to cool to a temperature of approximately 100° C., mixing the sugar at substantially the latter temperature with an amount of a solution containing an edible acid which the sugar can absorb as a solid and intimately mixing the resulting material with powdered pectin.

5. A process for preparing a jelly making product comprising treating sugar to substantially remove its water of crystallization, mixing with the treated sugar an edible acid solution containing a volume of water approximately equal to the amount of water necessary to replace said water of crystallization, and then combining the resultant mixture with pectin.

6. A process for preparing a jelly making product comprising producing a dry hard mass consisting of an edible acid solution mixed with sugar from which its water of crystallization has been substantially removed, the volume of water of said acid solution being approximately equal to the amount of removed water of crystallization, crushing said mass, and then combining the crushed mass with powdered pectin.

7. A process for preparing a jelly making product comprising forming a homogeneous mixture of an edible acid solution with a sugar which is substantially free of its water of crystallization, the volume of water of said acid solution not exceeding the amount required to hydrate said substance, powdering said mixture, and then mixing the same with finely divided pectin.

In testimony whereof, I have subscribed my name.

HERBERT T. LEO.

CERTIFICATE OF CORRECTION.

Patent No. 1,842,757.  Granted January 26, 1932, to

HERBERT T. LEO.

It is hereby certified that the above numbered patent was erroneously issued to the inventor said "Leo", whereas said patent should have been issued to Glen Smith, Trustee, as assignee of the entire interest in said invention, as shown by the records of assignments in this office; and that the said Letters Patent should be read with this correction therein that the same may conform to the record of the case in the Patent Office.

Signed and sealed this 26th day of April, A. D. 1932.

M. J. Moore,
Acting Commissioner of Patents.

(Seal)

necessary to replace said water of crystallization, and then combining the resultant mixture with pectin.

6. A process for preparing a jelly making product comprising producing a dry hard mass consisting of an edible acid solution mixed with sugar from which its water of crystallization has been substantially removed, the volume of water of said acid solution being approximately equal to the amount of removed water of crystallization, crushing said mass, and then combining the crushed mass with powdered pectin.

7. A process for preparing a jelly making product comprising forming a homogeneous mixture of an edible acid solution with a sugar which is substantially free of its water of crystallization, the volume of water of said acid solution not exceeding the amount required to hydrate said substance, powdering said mixture, and then mixing the same with finely divided pectin.

In testimony whereof, I have subscribed my name.

HERBERT T. LEO.

CERTIFICATE OF CORRECTION.

Patent No. 1,842,757.   Granted January 26, 1932, to

HERBERT T. LEO.

It is hereby certified that the above numbered patent was erroneously issued to the inventor said "Leo", whereas said patent should have been issued to Glen Smith, Trustee, as assignee of the entire interest in said invention, as shown by the records of assignments in this office; and that the said Letters Patent should be read with this correction therein that the same may conform to the record of the case in the Patent Office.

Signed and sealed this 26th day of April, A. D. 1932.

(Seal)

M. J. Moore,
Acting Commissioner of Patents.

CERTIFICATE OF CORRECTION.

Patent No. 1,842,757.  Granted January 26, 1932, to

HERBERT T. LEO.

It is hereby certified that the above numbered patent was erroneously issued to the inventor said "Leo", whereas said patent should have been issued to Glen Smith, Trustee, as assignee of the entire interest in said invention, as shown by the records of assignments in this office; and that the said Letters Patent should be read with this correction therein that the same may conform to the record of the case in the Patent Office.

Signed and sealed this 26th day of April, A. D. 1932.

(Seal)

M. J. Moore,
Acting Commissioner of Patents.